(12) United States Patent
Schultz

(10) Patent No.: US 7,082,871 B2
(45) Date of Patent: Aug. 1, 2006

(54) CLOSING DEVICE FOR A CONTAINER

(75) Inventor: Horst Schultz, Hochheim (DE)

(73) Assignee: Synkrona AG, Stans (CH)

( * ) Notice: Subject to any disclaimer, the term of this patent is extended or adjusted under 35 U.S.C. 154(b) by 76 days.

(21) Appl. No.: 10/486,058

(22) PCT Filed: Aug. 9, 2002

(86) PCT No.: PCT/EP02/08946

§ 371 (c)(1),
(2), (4) Date: Aug. 2, 2004

(87) PCT Pub. No.: WO03/015594

PCT Pub. Date: Feb. 27, 2003

(65) Prior Publication Data

US 2004/0250687 A1    Dec. 16, 2004

(30) Foreign Application Priority Data

Aug. 10, 2001 (DE) .......................... 201 13 356 U

(51) Int. Cl.
| A47J 27/00 | (2006.01) |
| A47J 27/08 | (2006.01) |
| A47J 27/09 | (2006.01) |
| B65D 45/00 | (2006.01) |
| B65D 45/34 | (2006.01) |

(52) U.S. Cl. .................... 99/337; 99/403; 220/316; 220/912

(58) Field of Classification Search ............ 99/330, 99/337, 338, 403–407, 339, 340, 342, 444–450; 220/573.1, 314–318, 756, 293, 912, 393, 220/323, 324, 202–206, 203.7, 203.19, 203.22; 126/373.1, 377.1, 369; 219/401, 440; 292/256.67, 292/256.69, DIG. 11, 139, 140; 426/510, 426/511, 523

See application file for complete search history.

(56) References Cited

U.S. PATENT DOCUMENTS

| 5,613,424 A | 3/1997 | Chameroy et al. ............ 99/337 |
| 5,927,183 A * | 7/1999 | Lee ............................. 99/337 |
| 6,135,013 A * | 10/2000 | Barrena ....................... 99/337 |
| 6,257,124 B1 * | 7/2001 | Chen ........................... 99/337 |
| 6,513,420 B1 * | 2/2003 | Park ............................ 99/337 |
| 6,546,848 B1 * | 4/2003 | Ehlhardt et al. ............. 99/403 |

FOREIGN PATENT DOCUMENTS

| CH | 254203 | 4/1948 |
| DE | 896 409 | 11/1953 |
| EP | 1 029 483 | 8/2000 |
| EP | 1 082 932 | 3/2001 |
| FR | 2 809 608 | 12/2001 |
| WO | WO 96/01070 | 1/1996 |

* cited by examiner

Primary Examiner—Timothy F. Simone
(74) Attorney, Agent, or Firm—Ohlandt, Greeley, Ruggiero & Perle, L.L.P.

(57) ABSTRACT

The invention relates to a closing device for a container with an opening, in particular for a cooking pot with an outwardly protruding pouring edge, said closing device comprising a lid for closing the opening of the container, a closing element arrangement with at least a first closing element, and a movement device for moving the first closing element, said first closing element being able to be moved in an inward direction upon actuation of the movement device and moving upward at least in parts during the inwardly directed movement.

28 Claims, 10 Drawing Sheets

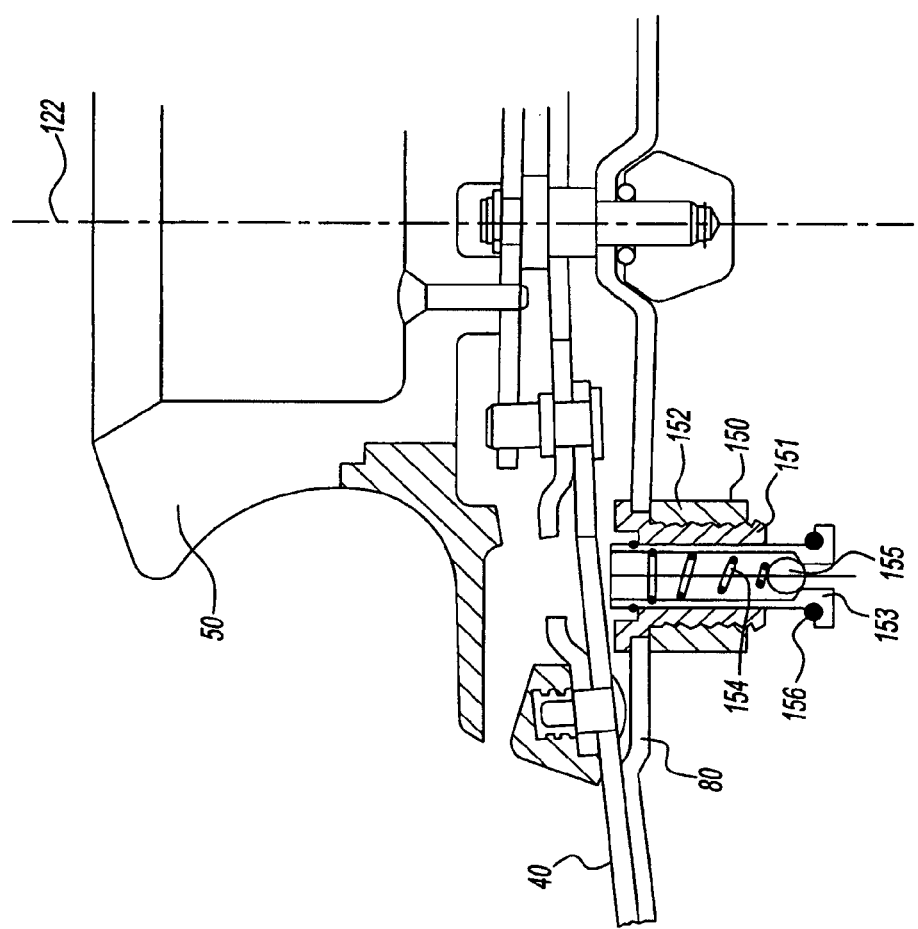

CLOSING DEVICE FOR A CONTAINER

BACKGROUND OF THE INVENTION

1. Field of the Invention

The invention relates to a closing device for a container in general and for a cooking pot or steam pressure cooking pot in particular.

2. Description of Related Art

At a time of increasing health awareness, there is also a greater demand for food preparation methods which are advantageous from the point of view of nutrition. At the same time, in a hectic world in which people want to and are able to spend less and less time on everyday household chores, there is a desire for fast and efficient food preparation. Steam pressure cooking pots satisfy these two apparently conflicting requirements outstandingly by permitting rapid and gentle cooking of food.

In principle, steam pressure cooking pots have been known for decades. However, the known steam pressure cooking pots have a number of disadvantages.

From the fifties, for example, and more specifically from patent specification DE 896 409, a steam pressure cooking pot is known with a lid which is closed by means of three jaws gripping round the edge of the lid. A disadvantage of this closure mechanism is that a substantial force is needed for closing it, this force being applied via an unwieldy lever.

More recent developments in the field of steam pressure cooking pots are described in laid-open specifications WO 96/01070, EP-A-1 029 483 and EP-A-1 082 932, for example.

A closure device which is known from laid-open specification WO 96/01070 has a lid with two radially displaceable clamping jaws which are drawn together by a spring mechanism. A disadvantage here is that a seal is prestressed in an undefined manner by pressing vertically on the lid before the clamping jaws are closed. The clamping jaws then slide abruptly inward and cause an annoying noise when they strike the pot edge.

Laid-open specification EP-A-1 082 932 discloses a steam pressure cooking pot with a similar lid as in document WO 96/01070.

U.S. Pat. No. 5,613,424 discloses a control device for opening and closing closure jaws for a pressure pot. The device comprises a control element which is mounted on a lid and, engaging in movement arms, moves radially with respect to the lid.

Furthermore, patent specification CH 254 203 describes a steam pressure cooking pot with an outwardly protruding edge. The lid of the steam pressure cooking pot comprises three gripping members which are bent in a U shape at their ends and which engage under the edge and press the lid with an interposed seal against the top face of the pot edge.

The document FR 2 809 608 A1 discloses a closing and opening device for a lid of a steam pressure cooking pot, which lid has four arms with clamping jaws which are driven by rotation of a control element.

In addition, laid-open specification EP-A-1 029 483 discloses a lid for a pressure pot with four movable clamping jaws which can be moved radially via a crank mechanism. This crank mechanism comprises a large number of movable components, some of them made of plastic. This crank mechanism is therefore complicated and expensive to produce and assemble, is not long-lasting, and is problematic with regard to hygiene requirements.

All of said devices have, however, further serious disadvantages in common.

The devices mentioned are cumbersome, esthetically unappealing, difficult to clean, and have to be produced with small tolerances.

SUMMARY OF THE INVENTION

In addition, a further serious disadvantage is that the known devices can be used only on specially adapted for moving at least the first closing element, preferably all of the closing elements.

The container has an axis which extends from a base to the opening and which in the case of circular containers in particular constitutes the axis of symmetry of rotation of the container. The axis preferably extends perpendicular to the container base.

The container moreover has an opening plane which is defined by the pouring edge and which preferably extends parallel to the container base and perpendicular to the axis. The first closing element or the closing elements is/are directed inward or moved toward the axis by an actuation of the movement device, and, during the inwardly directed movement or displacement, there occurs an upward movement, or movement away from the container base, of at least a portion of the closing element or closing elements.

This movement or displacement, in particular directed obliquely inward and upward, of the closing element or closing elements advantageously ensures a controlled downwardly directed pressure of the closing device onto the container or cooking pot, in particular for the defined prestressing of a seal arranged between the lid and the container.

Moreover, a reliable closure is ensured by the upward movement of the closing element or of the closing elements even in the case of considerable production tolerances. The closing device according to the invention is also especially suitable for commercially available cooking pots with an outwardly protruding pouring edge which is angled obliquely downward in the outer area. For cooking pots like these, most of the known lids for steam pressure cooking pots are not suitable, because their clamping jaws in most cases move horizontally, i.e. parallel to the opening plane or perpendicular to the axis. If known closing devices of this kind were nevertheless to be used in an inappropriate way, they would engage on the outermost, downwardly projecting portion of the pouring edge, i.e. with substantial leverage, and would possibly bend the pouring edge out of shape.

By contrast, the closing element of the closing device according to the invention is able to engage farther inward in relation to the pot axis. For this reason, the closing device according to the invention can cooperate with commercially available cooking pots, including those with relatively thin walls, resulting in a steam pressure cooking pot arrangement that is able to withstand pressure.

In particular, the closing element arrangement defines at least an open position in which the closing device can be removed from the container, and a closure position in which the lid seals the container, in particular in a substantially liquid-tight manner.

The container sealed off in the closure position is preferably able to withstand pressures up to at least about 5 bar internal pressure or internal overpressure.

In the open position, the closing element or closing elements is/are preferably in a first, in particular outer position, and, in the closure position, the closing element or closing elements is/are preferably in a second, in particular inner position, and it/they can be moved or displaced between the first position and second position. The movement or displacement between the first position and second position takes the form in particular of an inwardly directed radial movement in which the first closing element or the closing elements slides/slide on the lid.

The first closing element has in particular an outer edge for engaging on the pouring edge of the container. Upon the obliquely upward and radially inward movement of the first closing element, the outer edge comes to bear from underneath on the pouring edge of the container and, through the upward component of the movement, impacts the pouring edge with an axially upwardly directed force component.

The outwardly protruding pouring edge particularly preferably has an outwardly extending, substantially horizontal inner ring portion and a downwardly or obliquely downwardly extending outer ring portion. By means of the obliquely inward and upward movement of the first closing element upon closure of the container, the outer edge of the closing element can bear, at least in parts, from below on the inner ring portion of the pouring edge. The bearing point or ring is preferably situated as far inward as possible, e.g. on the inner half of the inner ring portion, so that the lever conditions are optimized and only a slight torque is exerted on the pouring edge. In particular, the bearing point or ring is not situated on the outer ring portion of the pouring edge.

According to a preferred embodiment of the invention, the outer edge of the closing element comprises a downwardly extending first portion and an upwardly extending second portion, the second portion being arranged to the inside of the first portion with respect to the container axis. The second portion ascends, for example perpendicularly or obliquely inward in relation to the opening plane.

Between the first portion and second portion there is preferably a third portion, which preferably extends substantially parallel to the plane of the pot. Upon closure of the closing device, the second portion in particular of the outer edge of the closing element comes to bear with force on the inner ring portion of the container, so that the closing device and with it possibly also the seal are pressed onto the container. In this case, the closure position is particularly preferably held with self-locking through the frictional forces generated.

It has proven particularly advantageous, and it is therefore preferred, to have an angle in the range of 5° to 30°, in particular in the range of 10° to 20°, most preferably in the range of about 15°, between the obliquely upwardly directed movement of the outer edge of the closing element, upon closure, and the opening plane of the container.

The seal is in particular designed as a sealing ring and preferably extends in a circle about the closing device. The seal is preferably attached to the lid in a releasable manner and is made for example of silicone or silicone-containing material.

It is particularly expedient to use what is called a sealing lip or lip seal, which has a substantially U-shaped or V-shaped cross section. The lip seal has the particular advantage that the pressure generated in the inside of the container forces the seal apart and thus improves the sealing action. Thus, relatively slight prestressing, as is generated by the closing operation, is still sufficient to achieve a closure that is very resistant to pressure.

According to a preferred development of the invention, the closing element has substantially the shape of a segment of a circle.

In particular, however, the segment tip can be removed or cut out. The circle segment shape is advantageous particularly in connection with an arrangement consisting of a plurality of preferably identical closing elements.

In the closure position, the closing elements particularly preferably form a substantially closed covering, by virtue of the fact that the circle-segment-shaped closing elements laterally adjoin one another, preferably flush with one another. There are preferably 2, 3, 4, 5, 6, 8 or more closing elements used. An optionally remaining central opening in the arrangement of closing elements is preferably covered from sight by a handle which is part of the movement device, so that in the closure position the impression given is of a conventional pot lid. In particular, in the closure position the lid is covered or concealed more or less completely by the closing element arrangement.

The lid and/or the closing element arrangement are preferably bulged outward at least in parts and preferably each form a sphere portion. In this embodiment, the closing elements preferably lie flat on the lid and slide on the latter. A radius in the range of 100 mm to 1000 mm, preferably in the range of 300 mm to 600 mm, has proven particularly expedient for the curvature of the sphere portions.

The closing element arrangement and the lid can preferably be connected to one another in a releasable manner by a central securing means, for example a screw. This makes it much easier to thoroughly clean the closing device.

The closing device, in particular the lid, preferably has centering means, for example projections extending downward from the lid. In the open position and/or the closure position, the centering means ensure a reliable and precise centering of the closing device, in particular of the lid, on the container.

The movement device preferably comprises a slotted guide disk secured on the handle, for example. In addition to having an axial bore, the slotted guide disk has, for each closing element, a curved slot extending obliquely to the circumference of the slotted guide disk. In the slot there is a bolt which is connected in fixed position to the corresponding closing element. By turning the slotted guide disk, the bolt is thus radially displaced with the closing element. Alternatively or as a complement to this, a toothed gear arrangement can also be used.

It is particularly preferable for the closing device, excluding the handle, to be made, in particular completely, of metal, for example of stainless steel. This gives a sturdy, long-lasting and hygienic closing device in which the coefficients of expansion of different component parts are adapted to one another and to the container.

Moreover, the closing device according to the invention preferably comprises a safety means with a blocking means for blocking the movement of the closing elements and/or an overpressure relief valve, in order to meet the legal safety requirements. Such safety means are known in principle to the person skilled in the art.

The invention is explained in more detail below on the basis of preferred embodiments and with reference to the figures.

BRIEF DESCRIPTION OF THE FIGURES

FIG. 9 shows a sectional view through a safety means.

DETAILED DESCRIPTION OF THE INVENTION

Figure 1:
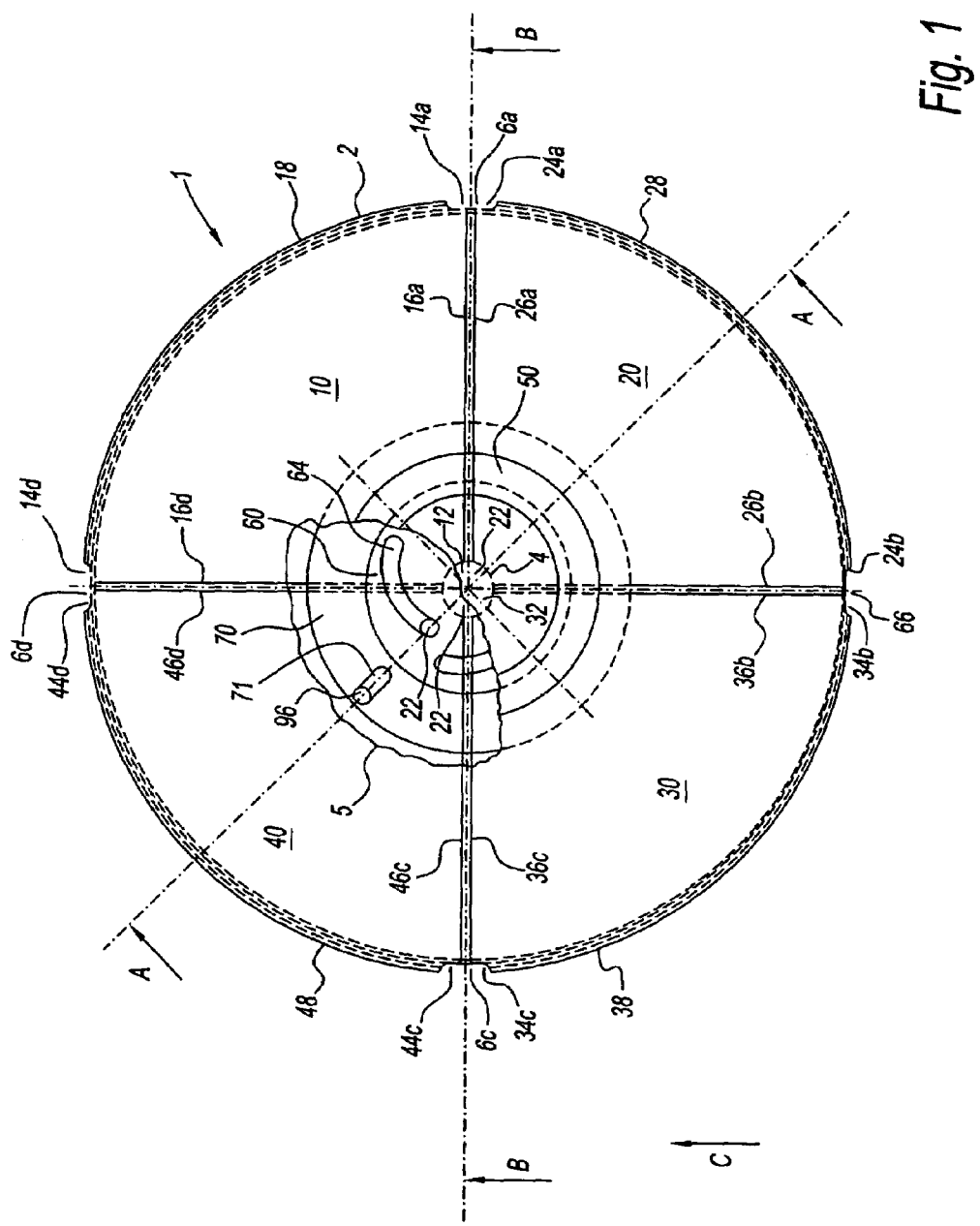
FIG. 1 shows a partially sectioned top view of a first embodiment of the closing device according to the invention, in a closure position.

FIG. 1 shows an embodiment of the closing device 1 according to the invention with a closing element arrangement 2, comprising four closing elements 10, 20, 30, 40 which are substantially in the shape of segments of a circle, and a rotationally symmetrical and rotatable handle 50 which is arranged centrally with respect to the closing device 1. Each of the four closing elements 10, 20, 30, 40 has in each case a central arc-shaped cutout 12, 22, 32, 42 and in each case two mutually adjoining cutouts 14d, 14a, 24a, 24b, 34b, 34c, 44c, 44d which are arranged at the outer corners of the closing elements located on the circumference.

In the closure position of the closing device 1 shown in FIG. 1, the cutouts 12, 22, 32, 42 substantially form a central circular cutout 4 of the closing element arrangement 2. The cutouts 14d, 14a, 24a, 24b, 34b, 34c, 44c, 44d form four cutouts 6a, 6b, 6c, 6d arranged at 90° along the circumference of the closing element arrangement 2.

The four closing elements 10, 20, 30, 40 each have two radial edges 16d, 16a, 26a, 26b, 36b, 36c, 46c, 46d and in each case an outer arc-shaped edge area 18, 28, 38, 48.

The closing element arrangement 2 is preferably first produced in one piece and shaped and then cut by means of a laser or a saw into four equal closing elements 10, 20, 30, 40. The laser cutting is particularly advantageous, as this avoids deburring.

The closing device 1 has been cut open in the area S so that a cutout of a slotted guide disk 60 and of a retaining and guide plate 70 can be seen.

The diameter of the closing device is about 240 mm, and the thickness of the closing elements is about 1 mm to 1.2 mm.

Figure 2:
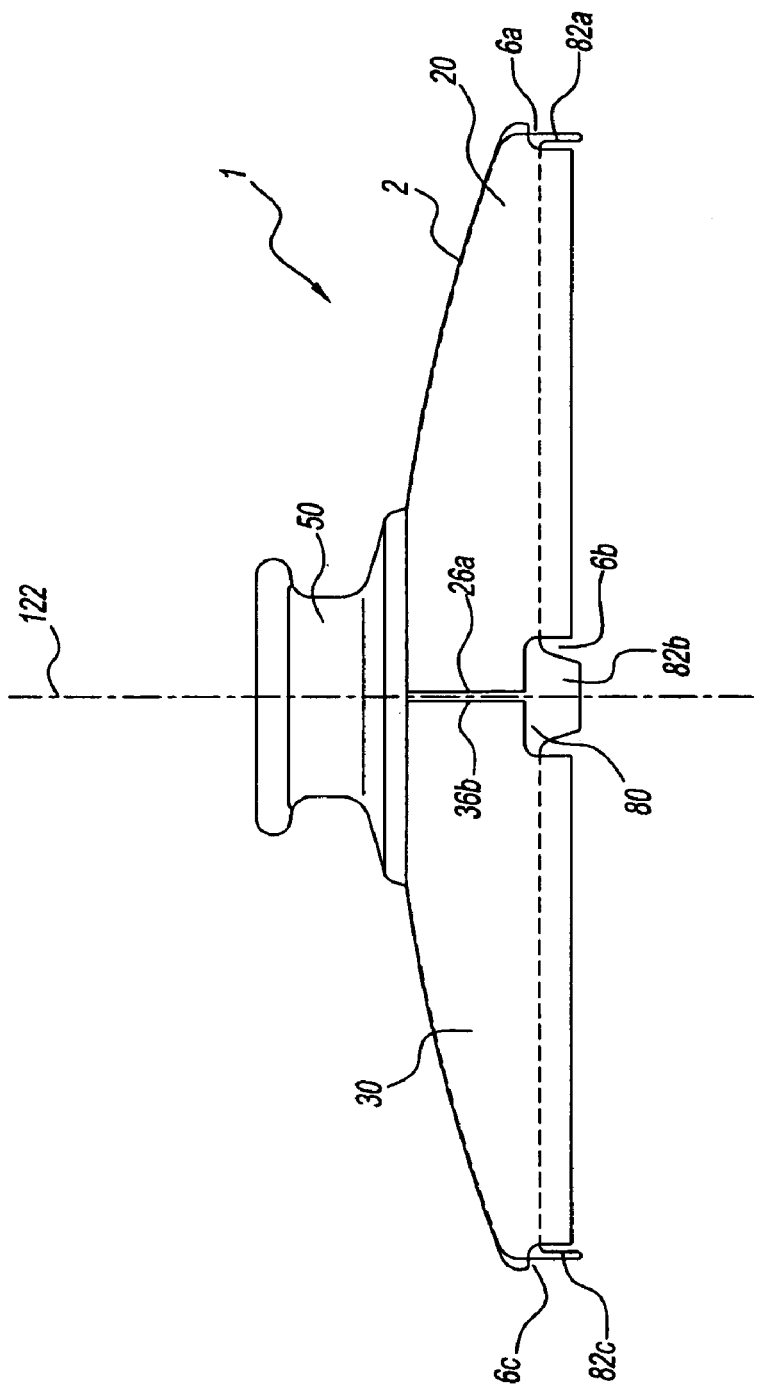
FIG. 2 shows a side view of the closing device from FIG. 1.

FIG. 2 shows the closing device 1 in a side view along the direction C in FIG. 1. This view includes the two closing elements 20 and 30, the handle 50, and a lid 80 which is arranged inside the closing element arrangement 2. The lid 80 has four centering tabs 82a, 82b, 82c, 82d which are arranged in the cutouts 6a, 6b, 6c, 6d of the closing element arrangement 2, and of which the rear centering tab 82d is not shown.

Figure 3A:
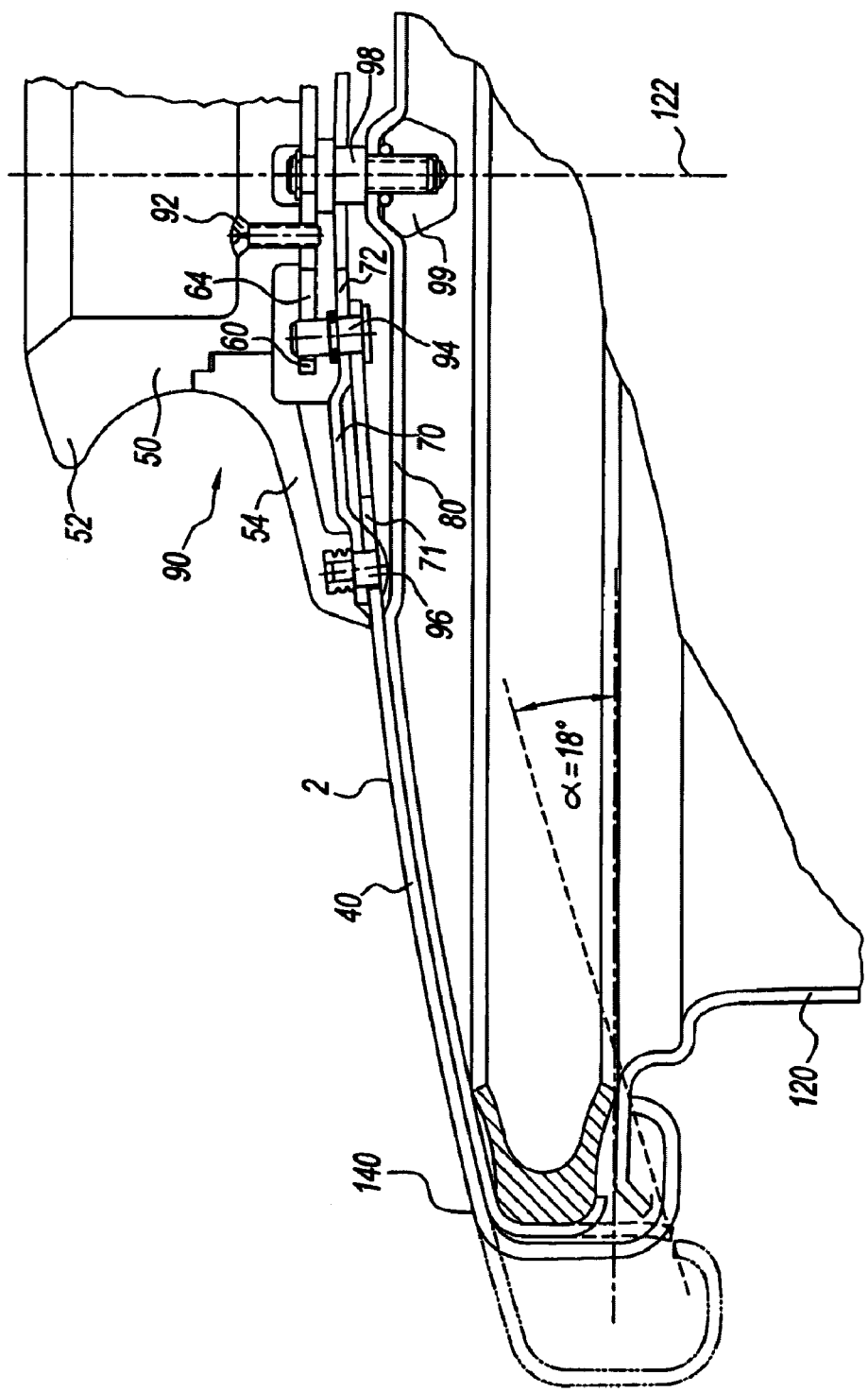
FIG. 3A shows a sectional view along the line A—A of a first embodiment of a detail of the closing device from FIG. 1, together with a detail of a pot.

FIG. 3A shows the closing device 1 in the closure position (solid lines). An edge area 140 of the closing element 40 is also indicated in the open position by broken lines. The other closing elements 10, 20, 30 are essentially identical to the first closing element 40.

FIG. 3A also shows a movement device 90 comprising the handle 50 made of plastic, the metal slotted guide disk 60, the metal guide plate 70, a screw 92, a drive pin 94, a guide screw 96, a central screw 98, and a central nut 99.

The handle 50 comprises a rotation knob 52 and a finger protection plate 54. The guide plate 70 is arranged between the slotted guide disk 60 and the closing element 40 and is completely concealed by the handle 50.

The guide screw 96 connects the closing element 40 to the guide plate 70, the closing element 40 being radially displaceable with respect to the guide plate 70. Upon the displacement, the guide screw 96 slides in a radially extending oblong hole 71 in the closing element 40. The drive pin 94 connects the closing element 40 to the guide plate 70, likewise in a radially displaceable manner, with the drive pin 94 sliding in an oblong hole 72 of the guide plate 70. The is drive pin 94 further extends through a curved oblong hole 64 in the slotted guide disk 60. The mechanism of displacement for the other three identical closing elements 10, 20, 30 is of equivalent design.

By turning the handle 50 about an axis 122 and the slotted guide disk 60 secured on the handle 50, the closing element 40 is displaced radially between the open position and the closure position by means of the drive pin 94.

Figure 3B:
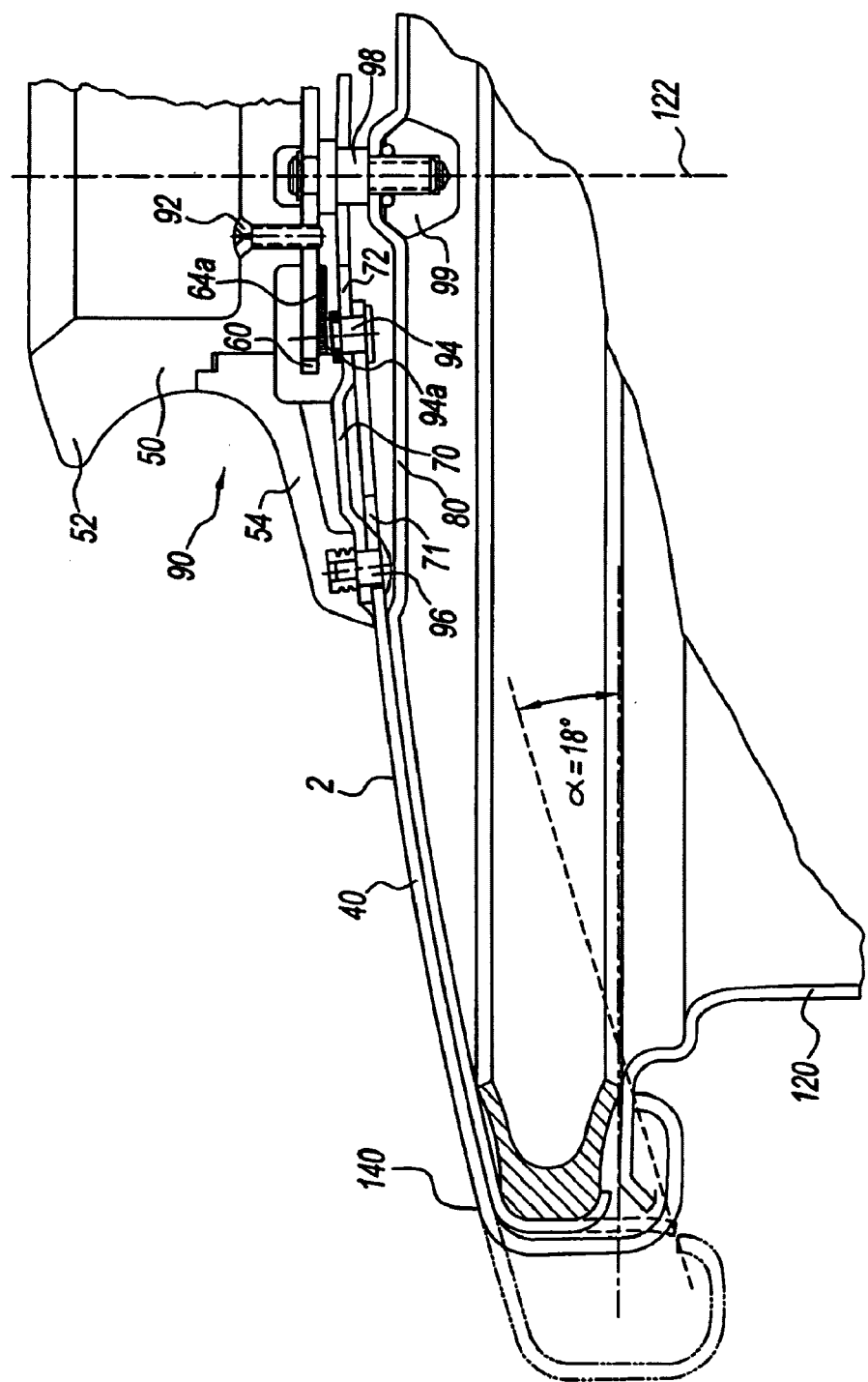
FIG. 3B shows a sectional view along the line A—A of a second embodiment of a detail of the closing device from FIG. 1, together with a detail of a pot.

Fig. 3B shows a movement device 90 comprising the handle 50 made of plastic, the metal slotted guide disk 60, the metal guide plate 70, a screw 92, a drive pin 94 having a toothed gearing 94a, a guide screw 96, a central screw 98, and a central nut 99.

The guide screw 96 connects the closing element 40 to the guide plate 70, the closing element 40 being radially displaceable with respect to the guide plate 70. Upon the displacement, the guide screw 96 slides in a radially extending oblong hole 71 in the closing element 40. The toothed gearing 94a of drive pin 94 connects the closing element 40 to the guide plate 70, likewise in a radially displaceable manner, with the drive pin 94 sliding in an oblong hole 72 of the guide plate 70. The toothed gearing 94a of drive pin 94 engages a curved oblong toothed gearing 64a of the slotted guide disk 60. The mechanism of displacement for the other three identical closing elements 10, 20, 30 is of equivalent design.

By turning the handle 50 about an axis 122 and the slotted guide disk 60 secured on the handle 50, the closing element 40 is displaced radially between the open position and the closure position by means of the toothed gearing 64a, 94a.

The closing element arrangement 2 and the lid 80 can be easily separated from one another by removing the central nut 99, for example for cleaning purposes.

Figure 4:
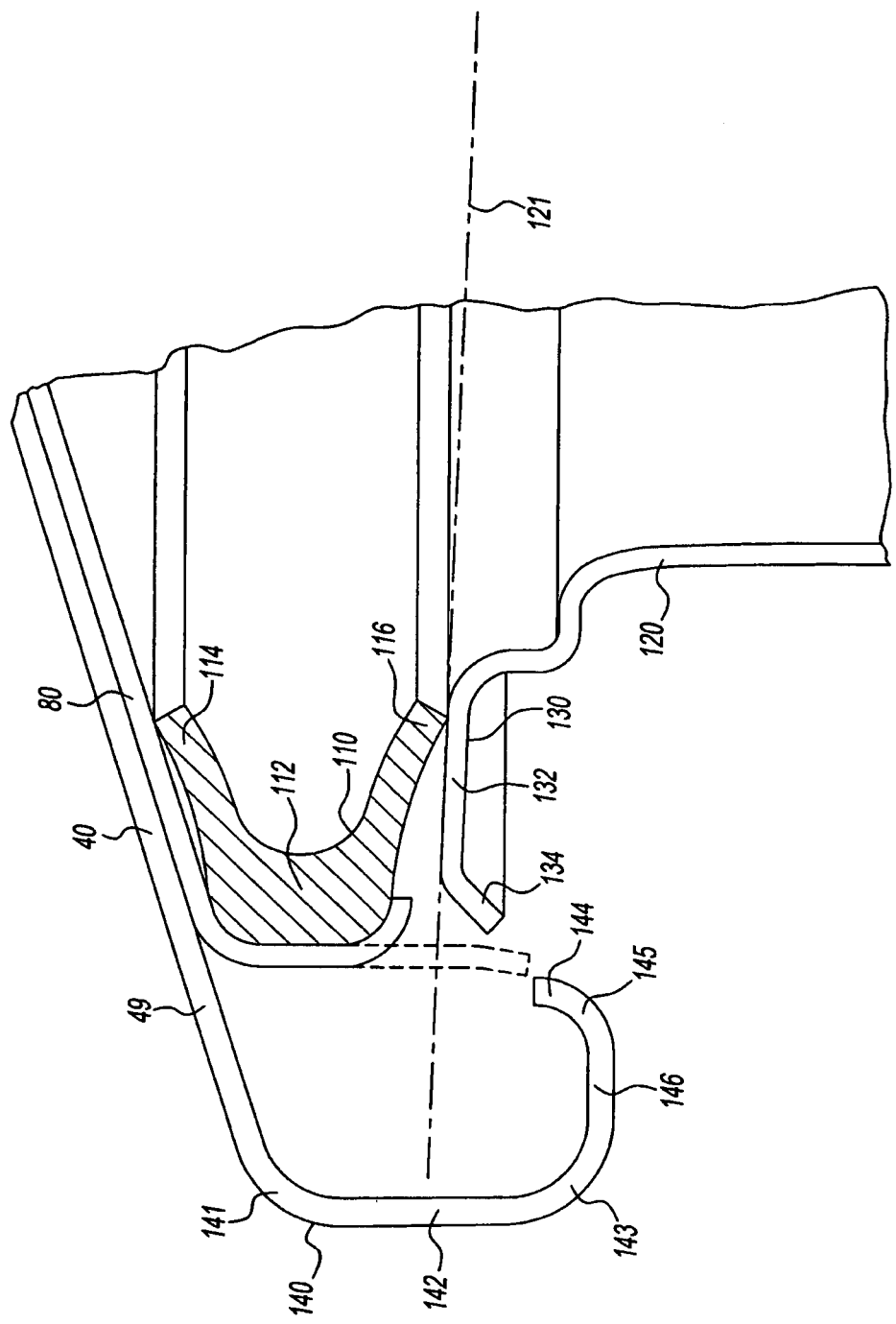
FIG. 4 shows an enlarged detail of the closing device and of the pot from FIG. 3, but in an open position.

An enlargement of the edge area 140 is illustrated in FIG. 4 in the open position. FIG. 4 shows a circularly extending lip seal 110. The lip seal 110 is made of silicone and is of substantially U-shaped cross section. The lip seal 110 comprises a central portion 112 and an upper lip portion 114 and lower lip portion 116. The central portion 112 and the upper lip portion 114 lie from inside and from below against the lid 80. The lower lip portion 116 comes to bear on a pouring edge 130 of a pot 120 of circular cross section, when the closing device 2 is fitted onto the pot or cooking pot 120.

The closing element 40 has a lid portion 49 which curves outward in relation to the inside of the pot, and a claw-like edge portion 140 for engaging around the pouring edge 130.

The surface of the lid portion 49 is in the shape of a spherical portion with a radius of about 400 mm. The claw-like edge portion 140 has a first downwardly extending portion 142 and a second upwardly extending portion 144. Here, the terms downward and upward are to be understood extending in the path of the closing element 40 away from the center or the axis 122. Arranged between the first portion 142 and the second portion 144, there is a third portion 146, which according to this illustrative embodiment is horizontal. The second and third portions 144, 146 are arranged inward in the direction of the axis or pot axis 122 in relation to the first portion 142, and under the lid portion 49. The closing element 40 is made of metal, in particular of stainless steel sheet, and the edge portion 140 is bent, rolled or beaded, so that curved portions 141, 143 and 145 are obtained between the portions 49, 142, 146 and 144 of the closing element 40.

The pouring edge 130 of the pot 120 has an inner ring portion 132 extending horizontally, or parallel to the pot surface 121, and a downwardly beveled outer ring portion 134.

In this embodiment, the centering tabs 82a, 82b, 82c, 82d are produced in one piece with the lid 80 and are indicated by broken lines in FIG. 4.

Figure 5:
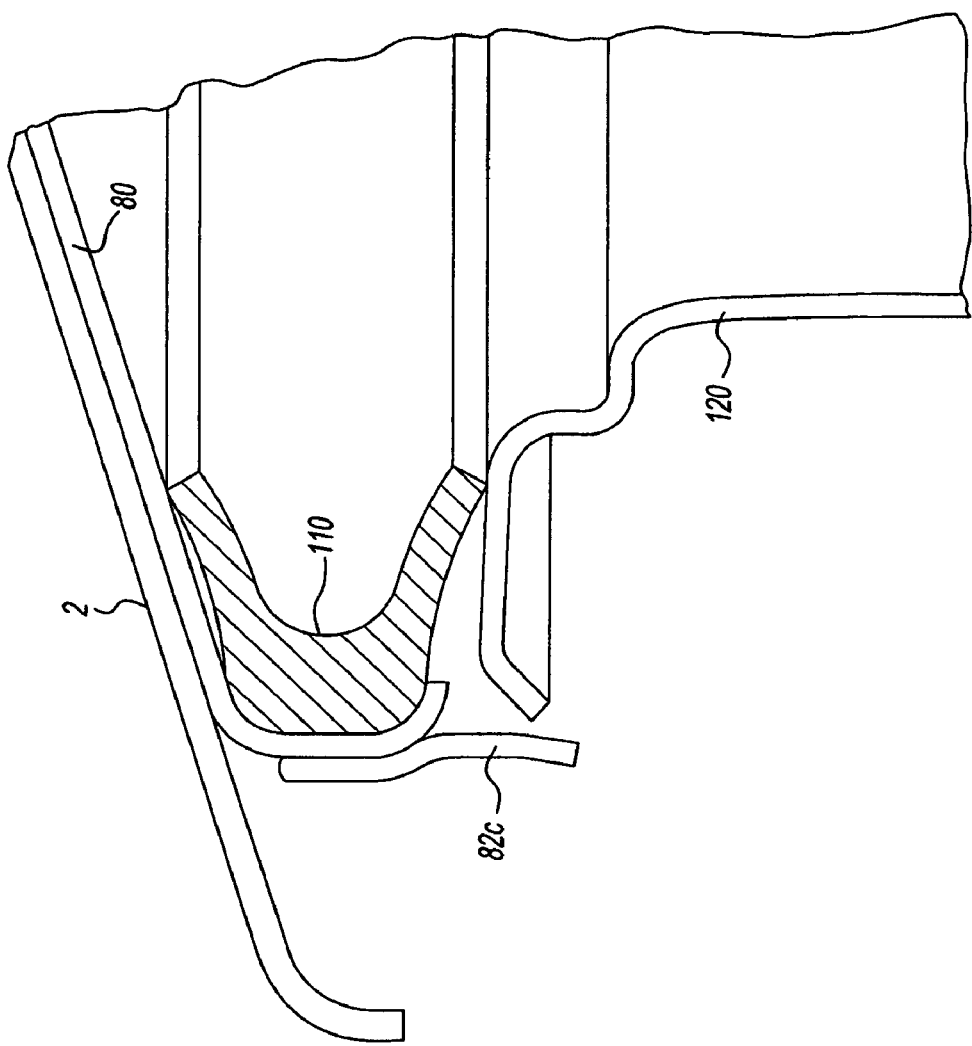
FIG. 5 shows a detail of a sectional view of a second embodiment of the closing device according to the invention, corresponding to a section along the line B—B in FIG. 1.

FIG. 5 shows a detail of a sectional view corresponding to a section along the line B—B in FIG. 1.

FIG. 5 illustrates an alternative embodiment of the centering tabs. A centering tab 82c is shown which has been secured, for example welded, from the outside onto the outer edge of the lid 80.

Figure 6C:
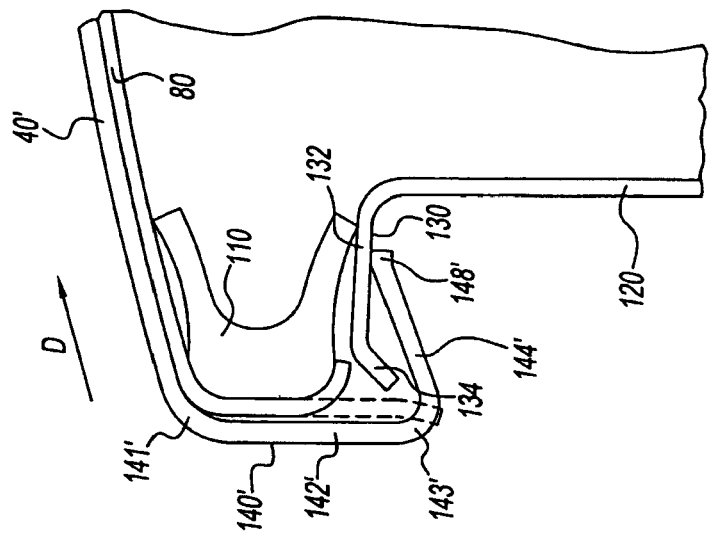
FIG. 6c shows the same view as in FIG. 6a, but in the closure position
Figure 6B:
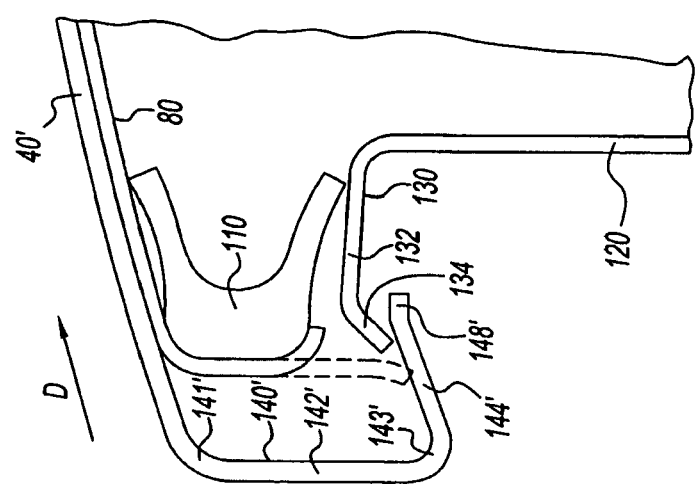
FIG. 6b shows the same view as FIG. 6a, but in a half closed position.
Figure 6A:
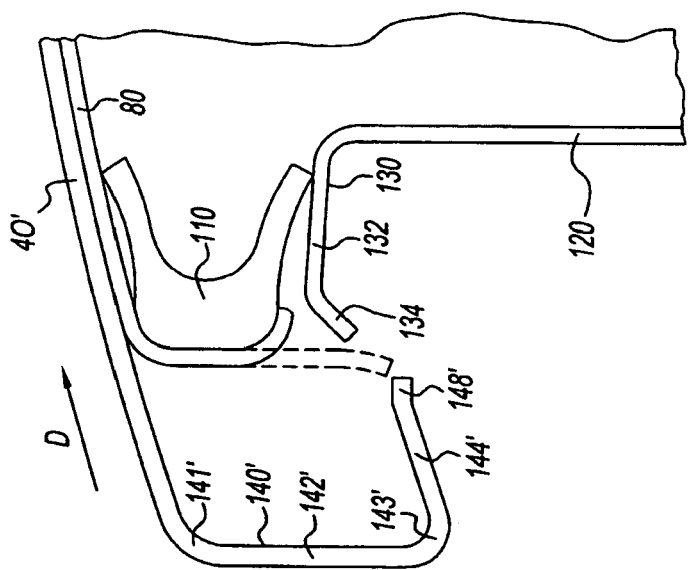
FIG. 6a shows a detail of a sectional view of a third embodiment of the closing device according to the invention, corresponding to a section along the line A—A in FIG. 1, in the open position.

FIGS. 6a through 6c show the movement of a closing element 40' which has been modified compared to the closing element 40. The closing element 40' comprises an outer, downwardly extending first portion 142', and an obliquely upwardly extending second portion 144'. Adjoining the second portion 144' there is a substantially horizontally extending end portion 148'. Curved portions 141' and 143' are also present.

FIG. 6a shows the closing element 40' in the open position. During closure, the closing element 40' slides on the lid 80 in direction D.

It is obvious that the second portion 144' and the end portion 148', together with the whole closing element 40', move upward during the inward closing displacement. As can best be seen from FIG. 3, the angle α between the direction of movement of the end portion 148' is about 18° in these illustrative embodiments.

FIG. 6b shows the closing element 40' or closing device 1 in a half closed position, in which the inner portion 144' already overlaps the pouring edge 130 of the pot 120 in part.

Referring now to FIG. 6c, the closing element 40' or closing element arrangement 2 is shown in the closed state or closure state. In the closure state, the second portion 144' of the closing element 40', or more exactly the inner horizontal end portion 148', bears with force on the pouring edge 130. It is obvious that, by means of the oblique upward movement of the closing element 40', a perpendicular or axial force is exerted on the lid 80 and lip seal 110, so that a defined prestressing of the lip seal 110 is obtained. In particular, the seal 110 is automatically prestressed when the movement device 90 is actuated to effect closure.

The point of engagement of the horizontal inner portion 148' lies relatively far inward on the pouring edge 130, in this illustrative embodiment within the center of the inner ring portion 132. In this way, the torque on the pouring edge 130 is kept low, with the result that the closing device 1 can even be used for pots 120 with a pouring edge thickness of less than 1.2 mm or less than 1.0 mm.

Figure 7:
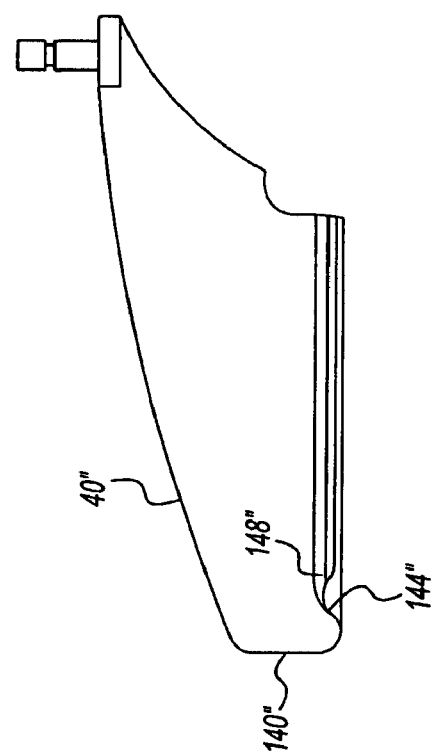
FIG. 7 shows a detail of a sectional view of a closing element according to a fourth embodiment of the invention.

FIG. 7 shows a fourth embodiment for the form of the outer edge of the closing element. According to this fourth embodiment, the outer edge 140" comprises an obliquely upwardly and inwardly extending second portion 144" with an end portion 148" which is bent downward in an arc shape and comes to bear on the pouring edge in the closure position.

Figure 8:
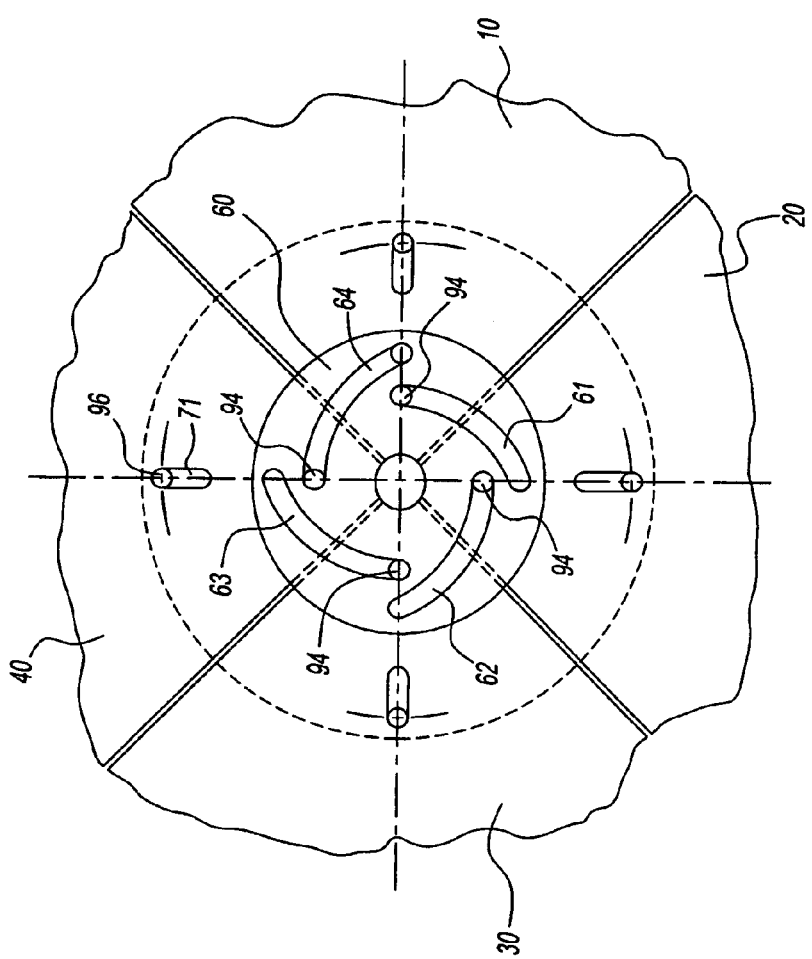
FIG. 8 shows a sectional top view of the closing device without handle.

FIG. 8 shows a plan view looking at the center of the closing device without the handle 50. This view shows the slotted guide disk 60 of stainless steel with four curved oblong holes 61, 62, 63, 64 which do not extend parallel to the circumference of the slotted guide disk 60 and thus, upon rotation, radially displace the drive pins 94 and, with them, the four closing elements 10, 20, 30, 40.

FIG. 9 shows a safety means 150 with a blocking device and integrated overpressure relief valve. The safety means 150 comprises a housing 151, a screwed connection 152, a valve pin 153, a valve spring 154, a valve ball 155, and an O-ring 156.

If the internal pressure in the closed pot rises above a first threshold value, the valve pin 153 is pushed upward through an opening in the closing element 40, so that the closing element arrangement 2 is blocked and can no longer be opened. If the pressure rises above a second threshold value, e.g. 5 bar, pressure is released automatically via the valve ball 155.

It will be clear to the skilled person that the invention is not limited to the embodiments described above and that instead it can be varied, particularly in relation to the concrete design of the outer edge of the closing elements and of the pouring edge, without departing from the spirit of the invention.

What is claimed is:

1. A closing device for a container with an opening and an outwardly protruding pouring edge that has an outwardly extending inner ring portion and an outwardly and/or downwardly extending outer ring portion, said closing device comprising:
   a lid for closing the opening;
   a closing element arrangement having at least a first closing element; and
   a movement device for moving the first closing element, said first closing element being able to be moved in an inward direction upon actuation of the movement device and moving upward at least in part during the inwardly directed movement, the closing element arrangement being configured so that in a closure position, an outer edge of the first closing element can bear from underneath, at least in part, against the inner ring portion.

2. The closing device as claimed in claim 1, wherein the closing element arrangement defines at least an open position in which the closing device can be removed from the container, and the closure position in which the container can be closed by the lid in a substantially liquid-tight manner.

3. The closing device as claimed in claim 2, wherein the container closed by the closing device can, in the closure position, withstand pressures of up to at least about 5 bar internal pressure.

4. The closing device as claimed in claim 2, wherein the first closing element, in the open position, assumes a first position relative to the lid and, in the closure position, assumes a second position relative to the lid and can move between the open position and the closure position.

5. The closing device as claimed in claim 1, wherein the first closing element has an outer edge which, upon the inwardly directed movement of the first closing element, comes to bear underneath the pouring edge.

6. The closing device as claimed in claim 5, wherein the closing element arrangement is configured so that, in the closure position, the outer edge can bear from below, at least in part, on the inner ring portion.

7. The closing device as claimed in claim 6, wherein, as a result of the outer edge bearing at least in part on the inner ring portion, the closure position is held with a force fit, a friction fit and/or a self-locking fit.

8. The closing device as claimed in claim 5, wherein the container defines an axis which extends centrally from a base of the container to the opening, and the outer edge has a downwardly extending first portion and an upwardly extending second portion, the second portion being arranged radially to the inside of the first portion with respect to the axis.

9. The closing device as claimed in claim 8, wherein the outer edge has an inwardly extending third portion which is arranged between the first portion and the second portion.

10. The closing device as claimed in claim 8, wherein the pouring edge defines an upper opening plane, wherein the inwardly and upwardly directed movement of the second portion takes place at an angle ($\alpha$) in the range of 5° to 30 to the upper opening plane.

11. The closing device as claimed in claim 1, further comprising a peripheral seal arranged on the lid so that the lid can be closed in a liquid-tight manner against the container.

12. The closing device as claimed in claim 11, wherein the peripheral seal comprises a sealing lip made of silicone-containing material.

13. The closing device as claimed in claim 11, wherein the peripheral seal is prestressed in the closure position.

14. The closing device as claimed in claim 11, wherein, as a result of the movement of the first closing element into the closure position, the outer edge comes to bear with force, at least in part, on the inner ring portion.

15. The closing device as claimed in claim 1, wherein the first closing element has substantially the shape of a segment of a circle.

16. The closing device as claimed in claim 1, wherein the closing element arrangement comprises a plurality of closing elements.

17. The closing device as claimed in claim 16, wherein the plurality of closing elements adjoin one another in the closed state and completely cover the lid.

18. The closing device as claimed in claim 1, wherein the closing element arrangement substantially bulges outward to form a sphere portion at least in part.

19. The closing device as claimed in claim 18, wherein the lid substantially bulges outward to form a sphere portion at least in some parts.

20. The closing device as claimed in claim 19, wherein the radius of the sphere portion of the closing element arrangement and/or of the lid is about 300 to 600 mm.

21. The closing device as claimed in claim 1, wherein the closing element arrangement, upon movement from the open position to the closure position, slides at least in some parts on the lid.

22. The closing device as claimed in claim 1, wherein the closing element arrangement and the lid are releasably connected to another by a central securing means.

23. The closing device as claimed in claim 1, further comprising centering means for centering the lid on the container.

24. The closing device as claimed in claim 23, wherein the centering means comprise projections that are secured on an outer edge of the lid and protrude substantially downward from the lid.

25. The closing device as claimed in claim 1, wherein the movement device comprises a handle, with the first closing element being able to be moved radially upon a rotational movement of the handle by means of a slotted guide disk.

26. The closing device as claimed in claim 1, wherein the movement device comprises a handle, with the first closing element being able to be moved radially upon a rotational movement of the handle by means of a toothed gearing.

27. The closing device as claimed in claim 1, further comprising a safety means for blocking the movement of the first closing element when there is an overpressure in the container.

28. A steam pressure cooking pot arrangement comprising:
   a cooking pot portion having an opening and an outwardly protruding pouring edge, the outwardly protruding pouring edge having an outwardly extending inner ring portion and an outwardly and/or downwardly extending outer ring portion;
   a lid for closing the opening;
   a first closing element having an outer edge; and
   a movement device for moving the first closing element in an inwardly and upwardly direction upon actuation of the movement device so that the outer edge bears from underneath, at least in part, against the inner ring portion when in a closure position.

* * * * *